(12) United States Patent
Ahn et al.

(10) Patent No.: US 10,852,593 B2
(45) Date of Patent: Dec. 1, 2020

(54) DISPLAY SUBSTRATE AND LIQUID CRYSTAL DISPLAY DEVICE COMPRISING THE SAME

(71) Applicant: SAMSUNG DISPLAY CO., LTD., Yongin-si (KR)

(72) Inventors: Kyusu Ahn, Yongin-si (KR); Dongil Yoo, Yongin-si (KR); Haeryeong Park, Yongin-si (KR); Sangyun Lim, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 16/367,606

(22) Filed: Mar. 28, 2019

(65) Prior Publication Data

US 2019/0227389 A1  Jul. 25, 2019

Related U.S. Application Data

(63) Continuation of application No. 15/384,927, filed on Dec. 20, 2016, now Pat. No. 10,268,087.

(30) Foreign Application Priority Data

Apr. 4, 2016  (KR) .................. 10-2016-0041012

(51) Int. Cl.
*G02F 1/1343* (2006.01)
*G02F 1/1337* (2006.01)
*G02F 1/1362* (2006.01)

(52) U.S. Cl.
CPC .. *G02F 1/134309* (2013.01); *G02F 1/133707* (2013.01); *G02F 1/134363* (2013.01);
(Continued)

(58) Field of Classification Search
CPC ......... G02F 1/134309; G02F 1/133707; G02F 2201/123; G02F 2201/128;
(Continued)

(56) References Cited

U.S. PATENT DOCUMENTS 8,059,243 B2  11/2011  Kim et al.
8,314,913 B2  11/2012  Um et al.
(Continued)

FOREIGN PATENT DOCUMENTS

KR  10-2012-0090371 A  8/2012
KR  10-2013-0101325 A  9/2013

OTHER PUBLICATIONS

Extended European Search Report dated Jul. 12, 2017 in connection with European Patent Application No. 17161273.2.

*Primary Examiner* — Hoan C Nguyen
(74) *Attorney, Agent, or Firm* — Kile Park Reed & Houtteman PLLC (57) ABSTRACT

A display substrate includes a base substrate having a plurality of pixel areas and a pixel electrode in a pixel area of the plurality of pixel areas. The pixel electrode a first stem portion extending in a first direction, a second stem portion extending from the first stem portion in a second direction that intersects the first direction, a plurality of branch portions diagonally extending from at least one of the first stem portion and the second stem portion, and a bent portion extending from at least one of the plurality of branch portions.

19 Claims, 7 Drawing Sheets

(52) U.S. Cl.
CPC .............. *G02F 2001/13629* (2013.01); *G02F 2001/134372* (2013.01); *G02F 2001/136295* (2013.01); *G02F 2201/122* (2013.01); *G02F 2201/123* (2013.01); *G02F 2201/128* (2013.01)

(58) Field of Classification Search
CPC ... G02F 2001/136295; G02F 2201/122; G02F 2001/13629
See application file for complete search history.

(56) References Cited

U.S. PATENT DOCUMENTS

| | | |
|---|---|---|
| 8,564,753 B2 | 10/2013 | You et al. |
| 8,643,813 B2 | 2/2014 | Lee et al. |
| 9,164,329 B2 | 10/2015 | Jung et al. |
| 2010/0079690 A1 | 4/2010 | Lee et al. |
| 2010/0110358 A1 | 5/2010 | Um et al. |
| 2012/0326950 A1 | 12/2012 | Park et al. |
| 2014/0043571 A1 | 2/2014 | Chang et al. |
| 2015/0234240 A1 | 8/2015 | Tae et al. |
| 2016/0195784 A1 | 7/2016 | Kang et al. |
| 2016/0216570 A1 | 7/2016 | Yang et al. |
| 2017/0242306 A1* | 8/2017 | Chang .................. H01L 27/124 |
| 2017/0293185 A1* | 10/2017 | Park .................. G02F 1/134309 |

\* cited by examiner

DISPLAY SUBSTRATE AND LIQUID CRYSTAL DISPLAY DEVICE COMPRISING THE SAME

CROSS-REFERENCE TO RELATED APPLICATIONS

This is a continuation application based on pending application Ser. No. 15/384,927, filed Dec. 20, 2016, the entire contents of which is hereby incorporated by reference.

Korean Patent Application No. 10-2016-0041012, filed on Apr. 4, 2016, in the Korean Intellectual Property Office, and entitled: "Display Substrate and Liquid Crystal Display Device Comprising the Same," is incorporated by reference herein in its entirety.

BACKGROUND

1. Field

Embodiments of the invention relate to a display substrate and a liquid crystal display (LCD) device including the display substrate.

2. Description of the Related Art

A display device may be classified into a liquid crystal display ("LCD") device, an organic light emitting diode ("OLED") display device, a plasma display panel ("PDP") device, an electrophoretic display ("EPD") device, and the like, based on a light emitting scheme thereof.

Among the various types of the display device, an LCD device generally includes two substrates including a pixel electrode and a common electrode respectively formed thereon and a liquid crystal layer interposed between the two substrates. Upon applying a voltage to the pixel electrode and the common electrode, liquid crystal molecules of the liquid crystal layer are rearranged, such that an amount of transmitted light may be controlled.

SUMMARY

Embodiments are directed to a display substrate including a base substrate having a plurality of pixel areas and a pixel electrode in a pixel area of the plurality of pixel areas. The pixel electrode a first stem portion extending in a first direction, a second stem portion extending from the first stem portion in a second direction that intersects the first direction, a plurality of branch portions diagonally extending from at least one of the first stem portion and the second stem portion, and a bent portion extending from at least one of the plurality of branch portions.

The bent portion may be substantially parallel to at least one of the first stem portion and the second stem portion.

The bent portion may be spaced apart from an adjacent one of the branch portions by a distance ranging from about 2 μm to about 10 μm.

The first stem portion and the second stem portion may form a cross shape.

The first stem portion may protrude in the first direction from the second stem portion.

The pixel electrode may further include a connecting portion extending from at least one of the first stem portion and the second stem portion and protruding beyond the branch portions in the first direction or the second direction, and an edge bar intersecting the connecting portion.

The connecting portion may have a length ranging from about 2 μm to about 10 μm.

The edge bar may be substantially parallel to at least one of the first stem portion and the second stem portion.

The edge bar may be substantially parallel to the bent portion.

The edge bar may be spaced apart from an adjacent one of the bent portions at a distance ranging from about 2 μm to about 10 μm.

A distance between the bent portion and the branch portion may be the same as a distance between the edge bar and the bent portion.

Embodiments are also directed to a display substrate including a base substrate having a plurality of pixel areas and a pixel electrode in a pixel area of the plurality of pixel areas. The pixel electrode includes a first stem portion extending in a first direction, a second stem portion extending from the first stem portion in a second direction that intersects the first direction, a plurality of branch portions diagonally extending from at least one of the first stem portion and the second stem portion, a connecting portion extending from at least one of the first stem portion and the second stem portion and protruding farther than the branch portions in the first direction or the second direction, and an edge bar intersecting the connecting portion.

The edge bar may be substantially parallel to at least one of the first stem portion and the second stem portion.

The edge bar may be spaced apart from an adjacent one of the branch portions at a distance ranging from about 2 μm to about 10 μm.

Embodiments are also directed to a liquid crystal display device including a first substrate (for example, a display substrate), a second substrate (for example, an opposing substrate) opposing the first substrate, and a liquid crystal layer between the first substrate and the second substrate. The first substrate may include a base substrate having a plurality of pixel areas and a pixel electrode in a pixel area of the pixel areas. The pixel electrode includes a first stem portion extending in a first direction, a second stem portion extending from the first stem portion in a second direction that intersects the first direction, a plurality of branch portions diagonally extending from at least one of the first stem portion and the second stem portion, and a bent portion extending from at least one of the plurality of branch portions.

The bent portion may be substantially parallel to at least one of the first stem portion and the second stem portion.

The bent portion may be spaced apart from an adjacent one of the branch portions at a distance ranging from about 2 μm to about 10 μm.

The pixel electrode may further include a connecting portion extending from at least one of the first stem portion and the second stem portion and protruding farther than the branch portions in the first direction or the second direction and an edge bar intersecting the connecting portion.

The connecting portion may have a length ranging from about 2 μm to about 10 μm.

The edge bar may be substantially parallel to at least one of the first stem portion and the second stem portion.

The edge bar may be spaced apart from an adjacent one of the bent portions at a distance ranging from about 2 μm to about 10 μm.

Embodiments are also directed to a liquid crystal display device including a first substrate (for example, a display substrate), a second substrate (for example, an opposing substrate) opposing the first substrate, and a liquid crystal layer between the first substrate and the second substrate.

The first substrate includes a base substrate having a plurality of pixel areas and a pixel electrode in a pixel area of the plurality of pixel areas. The pixel electrode includes a first stem portion extending in a first direction, a second stem portion extending from the first stem portion in a second direction that intersects the first direction, a plurality of branch portions diagonally extending from at least one of the first stem portion and the second stem portion, a connecting portion extending from at least one of the first stem portion and the second stem portion and protruding farther than the branch portions in the first direction or the second direction, and an edge bar intersecting the connecting portion.

BRIEF DESCRIPTION OF THE DRAWINGS

Features will become apparent to those of skill in the art by describing in detail exemplary embodiments with reference to the attached drawings in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. Like reference numerals refer to like elements throughout.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Figure 1:
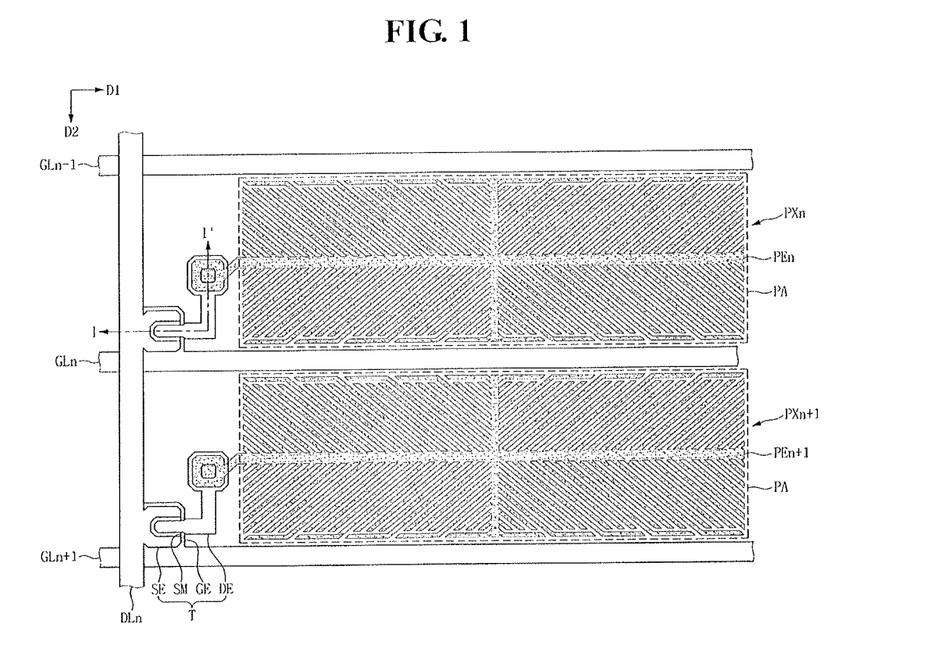
FIG. 1 illustrates a schematic plan view depicting an exemplary embodiment of a liquid crystal display (LCD) device.
Figure 2:
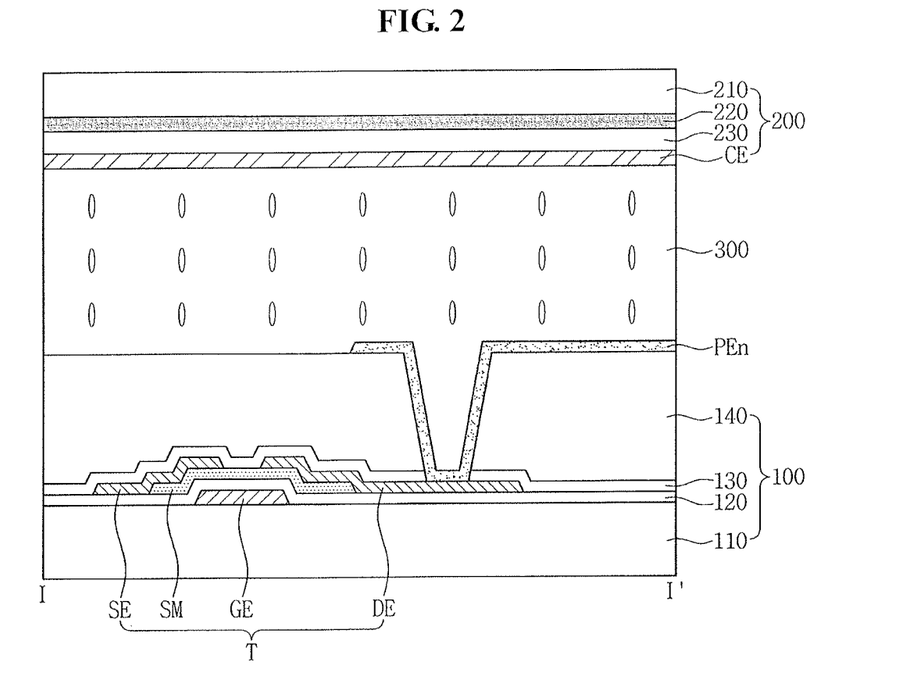
FIG. 2 illustrates a cross-sectional view taken along line I-I' of FIG. 1.

FIG. 1 illustrates a schematic plan view depicting an exemplary embodiment of a liquid crystal display (LCD) device, and FIG. 2 illustrates a cross-sectional view taken along line I-I' of FIG. 1. An exemplary embodiment of an LCD device includes a plurality of pixels. For ease of description, FIG. 1 illustrates two pixels $PX_n$ and $PX_{n+1}$ that are arranged in parallel to each other in a second direction D2. In FIG. 1, pixel electrodes $PE_n$ and $PE_{n+1}$ are depicted as having a longer length in a first direction D1 than a length thereof in a second direction D2. In some implementations, the length of the pixel electrodes $PE_n$ and $PE_{n+1}$ in the first direction D1 may be less than the length thereof in the second direction D2.

Referring to FIGS. 1 and 2, an exemplary embodiment of an LCD device includes a display substrate 100, an opposing substrate 200, and a liquid crystal layer 300 between the display substrate 100 and the opposing substrate 200. In addition, an exemplary embodiment of an LCD device may further include a backlight unit that provides light toward the display substrate 100.

The display substrate 100 may include a base substrate 110, a gate wiring $GL_{n-1}$, $GL_n$, $GL_{n+1}$, and GE, a gate insulating layer 120, a semiconductor layer SM, a data wiring $DL_n$, SE, and DE, an insulating interlayer 130, a passivation layer 140, pixel electrodes $PE_n$ and $PE_{n+1}$, and the like. As illustrated in FIGS. 1 and 2, a thin film transistor (TFT) may include a gate electrode GE, the semiconductor layer SM, a source electrode SE, and a drain electrode DE.

The base substrate 110 may include a plurality of pixel areas PA arranged in a matrix form. The base substrate 110 may be an insulating substrate, e.g., a plastic substrate that has light transmitting characteristics and flexibility. In some implementations, the base substrate 110 may include a hard substrate such as a glass substrate.

The gate wiring $GL_n-1$, $GL_n$, $GL_{n+1}$, and GE may be disposed on the base substrate 110.

The gate wiring $GLGL_n-1$, $GL_n$, $GL_{n+1}$, and GE may include gate lines $GLGL_n-1$, $GL_n$, and $GL_{n+1}$ extending in the first direction D1 and a gate electrode GE branching off from the gate lines $GLGL_n-1$, $GL_n$, and $GL_{n+1}$.

The gate wiring $GLGL_n-1$, $GL_n$, $GL_{n+1}$, and GE may include various kinds of metals and conductors. For example, the gate wiring $GLGL_n-1$, $GL_n$, $GL_{n+1}$, and GE may include or be formed of aluminum (Al) or an alloy thereof, silver (Ag) or an alloy thereof, copper (Cu) or an alloy thereof, molybdenum (Mo) or an alloy thereof, chromium (Cr), tantalum (Ta), titanium (Ti), and/or the like.

In some implementations, the gate wiring $GLGL_n-1$, $GL_n$, $GL_{n+1}$, and GE may have a multilayer structure including two or more conductive layers having different physical properties. For example, a conductive layer of the multilayer structure may include or be formed of a metal having low resistivity to reduce signal delay or voltage drop, e.g., an aluminum (Al)-based metal, a silver (Ag)-based metal, and a copper (Cu)-based metal. Another conductive layer of the multilayer structure may include a material that has an excellent contact property with indium tin oxide (ITO) and indium zinc oxide (IZO), e.g., a molybdenum-based metal, chromium, titanium, tantalum, or the like.

Examples of the multilayer structure may include a chromium lower layer and an aluminum upper layer, an aluminum lower layer and a molybdenum upper layer, a titanium lower layer and a copper upper layer. The gate wiring $GL_n-1$, $GL_n$, $GL_{n+1}$, and GE may be simultaneously formed in a same process.

The gate insulating layer 120 may be disposed on the base substrate 110 on which the gate wiring $GL_n-1$, $GL_n$, $GL_{n+1}$, and GE is disposed. The gate insulating layer 120 may include silicon oxide ($SiO_x$) or silicon nitride ($SiN_x$), as examples. In some implementations, the gate insulating layer 120 may further include aluminum oxide, titanium oxide, tantalum oxide, or zirconium oxide.

The semiconductor layer SM may be disposed on the gate insulating layer 120.

The semiconductor layer SM may include or be formed of amorphous silicon or an oxide semiconductor including at least one selected from the group of gallium (Ga), indium (In), tin (Sn), and zinc (Zn). In some implementations, an ohmic contact layer may be disposed on the semiconductor layer SM.

In FIG. 2, the semiconductor layer SM is depicted as substantially overlapping the gate electrode GE. In some implementations, the semiconductor layer SM may substantially overlap the data wiring $DL_n$, SE, and DE to be described below.

The data wiring $DL_n$, SE, and DE may be disposed on the base substrate 110 on which the semiconductor layer SM is disposed.

The data wiring $DL_n$, SE, and DE may include a data line $DL_n$ extending in the second direction D2, which intersects the first direction D1, the source electrode SE branching off from the data line $DL_n$ to overlap the semiconductor layer SM, and the drain electrode DE spaced apart from the source electrode SE and overlapping the semiconductor layer SM. The data wiring $DL_n$, SE, and DE may include the same material as that included in the gate wiring $GLGL_n-1$, $GL_n$, $GL_{n+1}$ and GE. The data wiring $DL_n$, SE, and DE may be simultaneously formed in a same process.

The insulating interlayer 130 may be disposed on the base substrate 110 on which the data wiring $DL_n$, SE, and DE is disposed. The insulating interlayer 130 may have a monolayer structure or a multilayer structure including, for example, silicon oxide, silicon nitride, a photosensitive organic material, or a low dielectric constant insulating material such as a-Si:C:O or a-Si:O:F.

The passivation layer 140 may be disposed on the insulating interlayer 130. The passivation layer 140 may have a monolayer or multilayer structure including, for example, silicon oxide, silicon nitride, a photosensitive organic material, or a silicon-based low dielectric constant insulating material.

In some implementations, when a color filter on array (COA) structure is provided, a color filter may be provided in lieu of the passivation layer 140, or the color filter may be disposed between the insulating interlayer 130 and the passivation layer 140.

The pixel electrodes $PE_n$ and $PE_{n+1}$ may be disposed on the passivation layer 140. The pixel electrodes $PE_n$ and $PE_{n+1}$ may pass through the insulating interlayer 130 and the passivation layer 140 to be connected to the drain electrode DE.

The pixel electrodes $PE_n$ and $PE_{n+1}$ may include or be formed of a transparent conductive material. For example, the pixel electrodes $PE_n$ and $PE_{n+1}$, may include at least one selected from the group of indium tin oxide (ITO), indium zinc oxide (IZO), indium tin zinc oxide (ITZO), aluminum zinc oxide (AZO), and amorphous indium tin oxide (a-ITO).

A lower alignment layer may be disposed on the pixel electrodes $PE_n$ and $PE_{n+1}$. The lower alignment may be a homeotropic alignment layer or a photoalignment layer including a photopolymerizable material.

Figure 3:
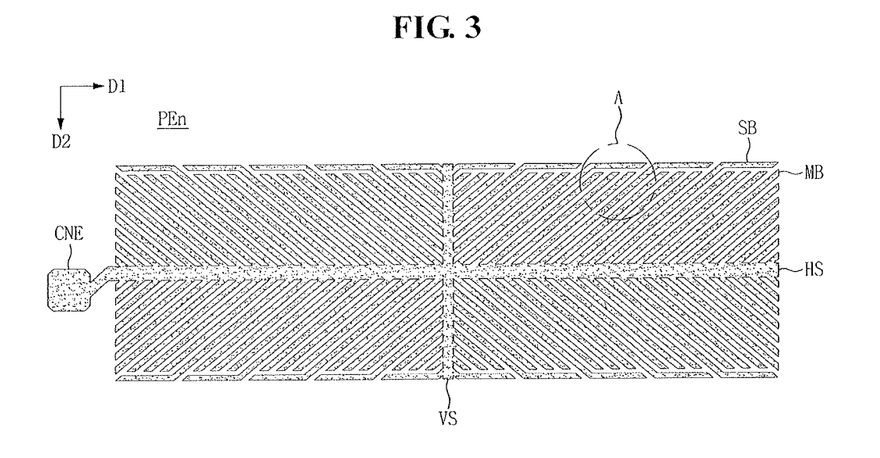
FIG. 3 illustrates a plan view depicting an exemplary embodiment of a pixel electrode of FIG. 1.
Figure 4:
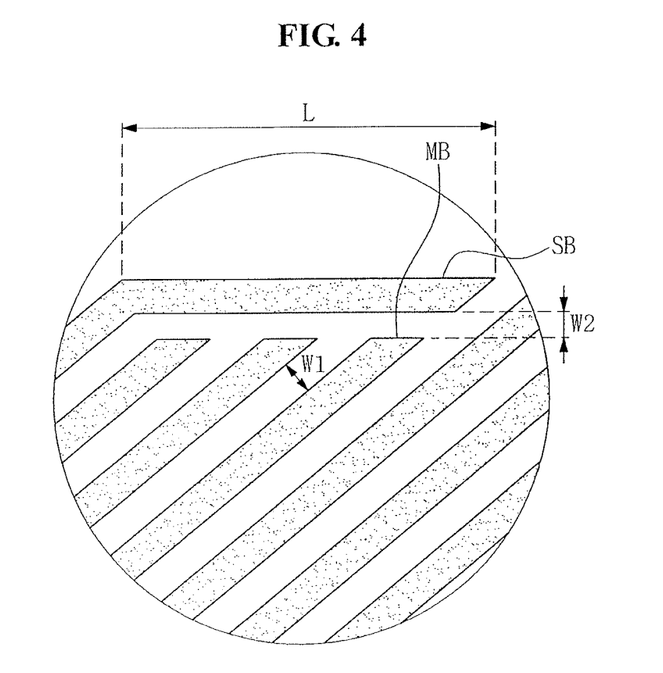
FIG. 4 illustrates an enlarged view depicting an area "A" of FIG. 3.

FIG. 3 illustrates a plan view depicting an exemplary embodiment of a pixel electrode of FIG. 1, and FIG. 4 illustrates an enlarged view depicting an area "A" of FIG. 3.

Referring to FIGS. 3 and 4, the pixel electrode $PE_n$ may include a first stem portion HS extending in the first direction D1, a second stem portion VS extending from the first stem portion HS in the second direction D2, which intersects the first direction D1, a plurality of branch portions MB diagonally extending from at least one of the first stem portion HS and the second stem portion VS, and a bent portion SB extending from at least one of the plurality of branch portions MB. The pixel electrode $PE_n$ may further include a connecting electrode CNE connected to the drain electrode DE.

The first stem portion HS and the second stem portion VS may be disposed in a cross shape. In an exemplary embodiment, the first stem portion HS may have a shape protruding from the second stem portion VS.

In FIG. 3, the bent portion SB is depicted as extending parallel to the first stem portion HS. In some implementations, the bent portion SB may extend at a predetermined angle with respect to the first stem portion HS. In some implementations, the bent portion SB may extend parallel to the second stem portion VS.

In FIG. 3, the bent portion SB is depicted as having a shape bent outwardly with respect to the second stem portion VS. In some implementations, the bent portion SB may have a shape bent inwardly with respect to the second stem portion VS, or a shape bent inwardly or outwardly with respect to the first stem portion HS.

The number of the bent portions SB may vary based on the shape and size of the pixel electrode $PE_n$. For example, in FIGS. 3 and 4, it is that every fourth branch portion MB has the bent portion SB A length L of the bent portion SB may vary based on the shape and size of the pixel electrode $PE_n$.

Referring to FIG. 4, the branch portions MB may have a spacing distance W1 from one another ranging from about 2 μm to about 10 μm. The bent portion SB may have a spacing distance W2 from an adjacent one of the branch portions MB ranging from about 2 μm to about 10 μm.

When at least one bent portion SB of the plurality of branch portions MB is bent along an edge of the pixel electrode $PE_n$, an effect of a fringe field that externally exerts inwardly of the pixel electrode $PE_n$ may be significantly reduced. Accordingly, control over liquid crystals may be improved at the edge of the pixel electrode $PE_n$, and the display quality of the LCD device may be improved.

Referring back to FIGS. 1 and 2, the opposing substrate 200 may include an opposing base substrate 210, a black matrix 220, a color filter 230, a common electrode CE, or the like.

The opposing base substrate 210 may be an insulating substrate, e.g., a plastic substrate, having light transmitting characteristics and flexibility. In some implementations, the opposing base substrate 210 may include a hard substrate such as a glass substrate.

The black matrix 220 may be disposed on the opposing base substrate 210. The black matrix 220 may form a black matrix on array (BOA) structure in which the black matric 220 as a light blocking member is disposed on the base substrate 110.

The black matrix 220 may include or be formed of a photosensitive composition. Examples of the photosensitive composition may include a binder resin, a polymerizable monomer, a polymerizable oligomer, a pigment, a dispersant, and a photoinitiator. The pigment may include a black pigment, a black resin, or the like.

The color filter 230 may be disposed on the black matrix 220.

The color filter 230 may be one selected from a red color filter, a green color filter, a blue color filter, a cyan color filter, a magenta color filter, a yellow color filter, and a white color filter. Three primary colors of red, green, and blue, or cyan, magenta, and yellow may define a basic pixel group for forming a color.

The common electrode CE may be disposed on the opposing base substrate 210 on which the color filter 230 is disposed. In some implementations, the common electrode CE may be disposed on the base substrate 110.

The common electrode CE may be in a form of a whole plate electrode including a transparent conductor such as indium tin oxide (ITO) or indium zinc oxide (IZO). In some implementations, the common electrode CE may include an uneven portion or at least one slit to define a plurality of domains.

An upper alignment layer may be disposed on the common electrode CE. The upper alignment layer may be a photoalignment layer including a homeotropic alignment layer or a photopolymerizable material.

FIGS. 5, 6, 7, and 8 illustrate plan views depicting embodiments of a pixel electrode. Descriptions of common features with the pixel electrode described above will not be repeated.

Figure 5:
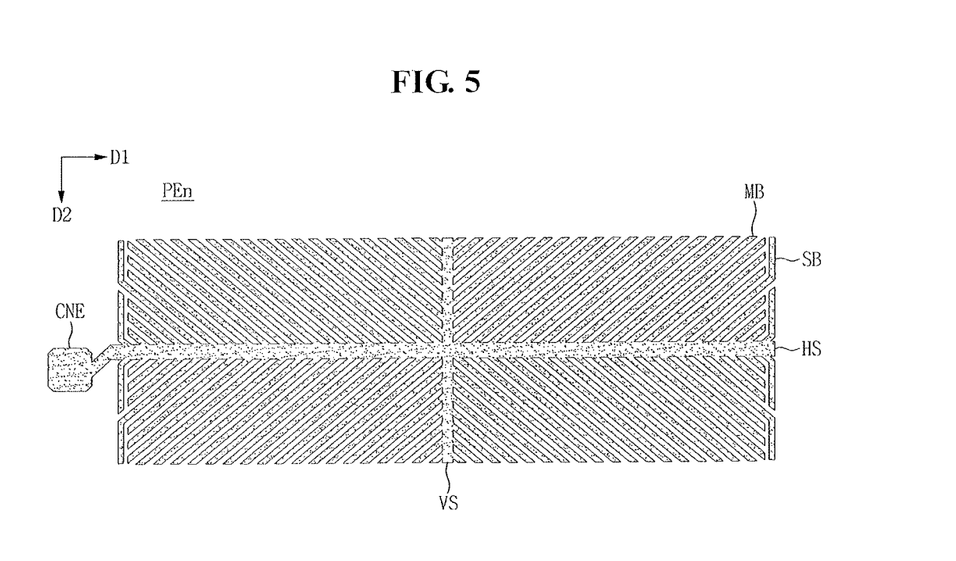
FIGS. 5, 6, 7, and 8 illustrate plan views depicting exemplary embodiments of a pixel electrode.
Figure 6:
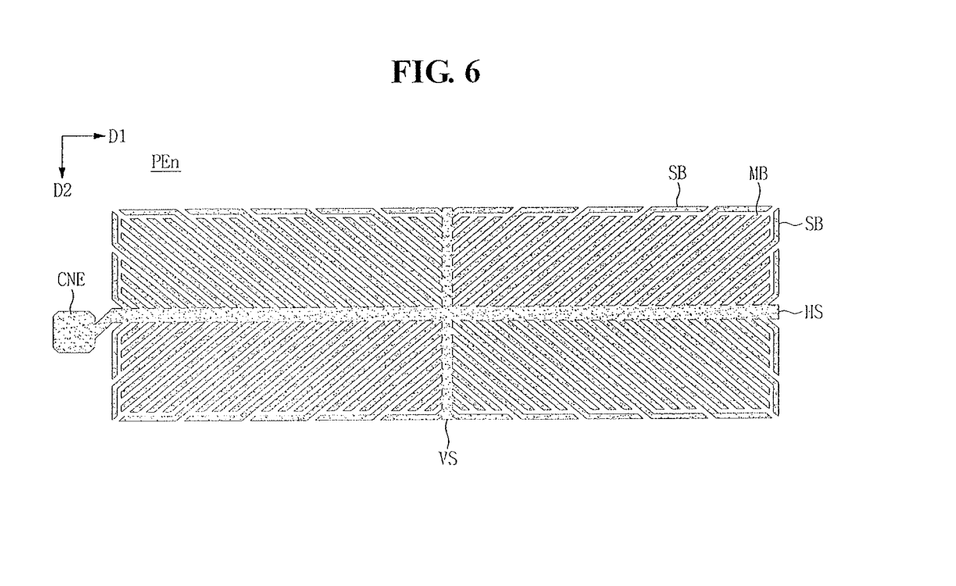
Figure 7:
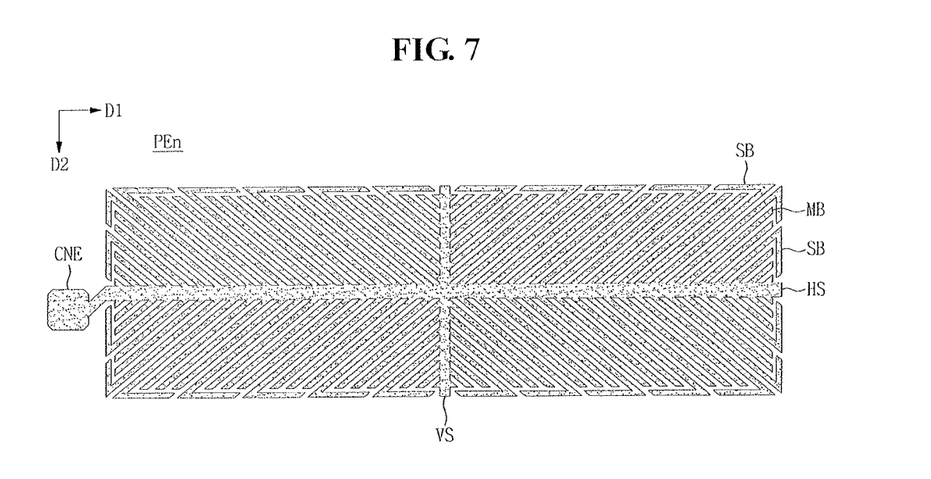

Referring to FIGS. 5, 6, and 7, an a pixel electrode $PE_n$ may include a first stem portion HS extending in a first direction D1, a second stem portion VS extending from the first stem portion HS in a second direction D2 that intersects the first direction D1, a plurality of branch portions MB diagonally extending from at least one of the first stem portion HS and the second stem portion VS, and a bent portion SB extending from at least one of the plurality of branch portions MB. In addition, the pixel electrode $PE_n$ may further include a connecting electrode CNE connected to a drain electrode DE.

The first stem portion HS and the second stem portion VS may have a cross shape.

In some implementations, the bent portions SB may be bent outwardly with respect to the first stem portion HS and may extend parallel to the second stem portion VS (refer to FIG. 5). In some implementations, the bent portions SB may be bent outwardly with respect to the first stem portion HS and the second stem portion VS and extend parallel to the second stem portion VS and the first stem portion HS, respectively (refer to FIG. 6).

In some implementations, the bent portions SB may be bent inwardly with respect to the first stem portion HS and the second stem portion VS and extend parallel to the second stem portion VS and the first stem portion HS, respectively (refer to FIG. 7).

Figure 8:
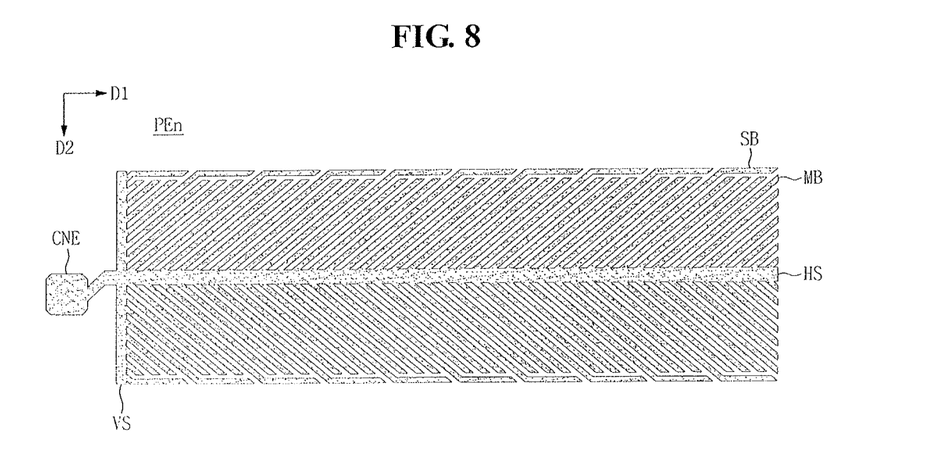

Referring to FIG. 8, a pixel electrode $PE_n$ may include a first stem portion HS extending in a first direction D1, a second stem portion VS extending from the first stem portion HS in a second direction D2 that intersects the first direction D1, a plurality of branch portions MB diagonally extending from at least one of the first stem portion HS and the second stem portion VS, and a bent portion SB extending from at least one of the plurality of branch portions MB. In addition, the pixel electrode $PE_n$ may further include a connecting electrode CNE connected to a drain electrode DE. The second stem portion VS may extend from the first stem portion VS at one end of the pixel electrode, for example, at an end adjacent to the connecting electrode CNE. The first stem portion HS may protrude in the first direction D1 and some of the plurality of branch portions MB may protrude diagonally from one side of the second stem portion VS.

In FIG. 8, the bent portion SB is depicted as extending parallel to the first stem portion HS. In some implementations, the bent portion SB may extend at a predetermined angle with respect to the first stem portion HS. In some implementations, the bent portion SB may extend parallel to the second stem portion VS.

Figure 9:
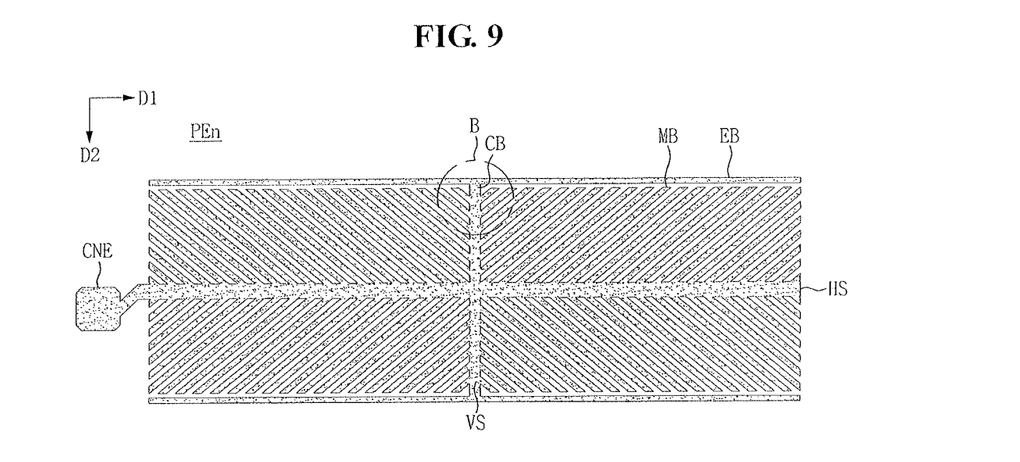
FIG. 9 illustrates a plan view depicting an exemplary embodiment of a pixel electrode.
Figure 10:
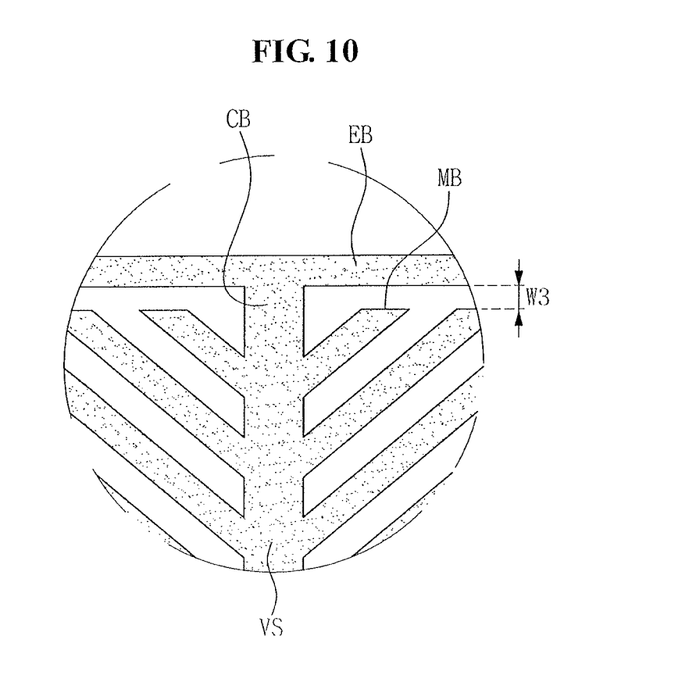
FIG. 10 illustrates an enlarged view depicting an area "B" of FIG. 9.

FIG. 9 illustrates a plan view depicting an embodiment of a pixel electrode, and FIG. 10 illustrates an enlarged view depicting an area "B" of FIG. 9. Descriptions of common features with the pixel electrode described above will not be repeated.

Referring to FIGS. 9 and 10, a pixel electrode $PE_n$ may include a first stem portion HS extending in a first direction D1, a second stem portion VS extending from the first stem portion HS in a second direction D2 that intersects the first direction D1, a plurality of branch portions MB diagonally extending from at least one of the first stem portion HS and the second stem portion VS, a connecting portion CB extending from an end of at least one of the first stem portion HS and the second stem portion VS to protrude beyond the branch portion MB in the first direction D1 or the second direction D2, and an edge bar EB intersecting the connecting portion CB. The pixel electrode $PE_n$ may further include a connecting electrode CNE connected to a drain electrode DE.

In FIG. 9, the edge bar EB is depicted as extending parallel to the first stem portion HS. In some implementations, the edge bar EB may extend at a predetermined angle with respect to the first stem portion HS. In some implementations the edge bar EB may extend parallel to the second stem portion VS. The edge bar EB may have the same length as at least one of the first stem portion HS and the second stem portion VS.

Referring to FIG. 10, the connecting portion CB may have a length ranging from about 2 μm to about 10 μm. The edge bar EB may have a distance W3 from an adjacent one of the branch portions MB ranging from about 2 μm to about 10 μm.

As such, When the edge bar EB is disposed along an edge of the pixel electrode $PE_n$, an effect of a fringe field that externally exerts inwardly of the pixel electrode $PE_n$ may be significantly reduced. Accordingly, control over liquid crystals may be improved at the edge of the pixel electrode $PE_n$, and display quality of the LCD device may be improved.

Figure 11:
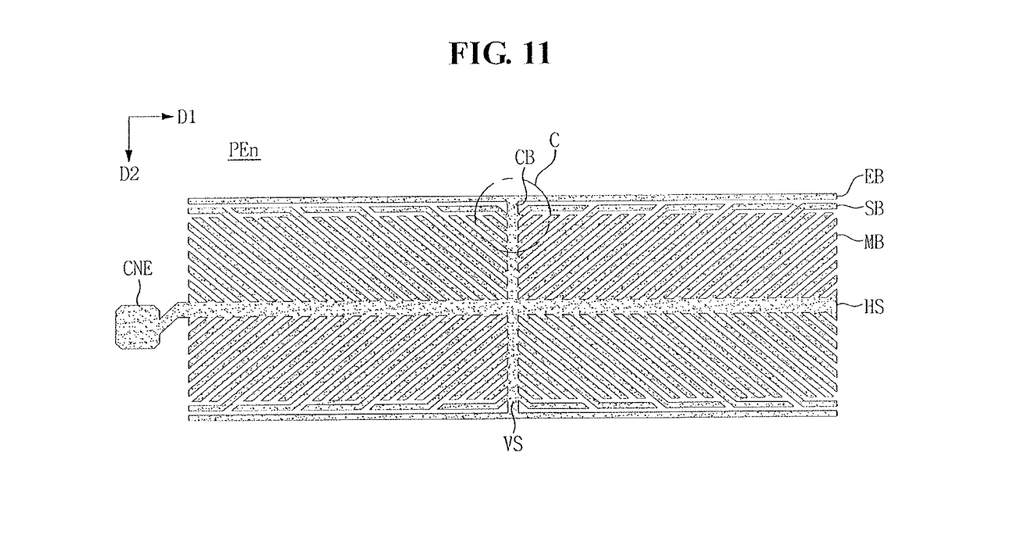
FIG. 11 illustrates a plan view depicting an exemplary embodiment of a pixel electrode.
Figure 12:
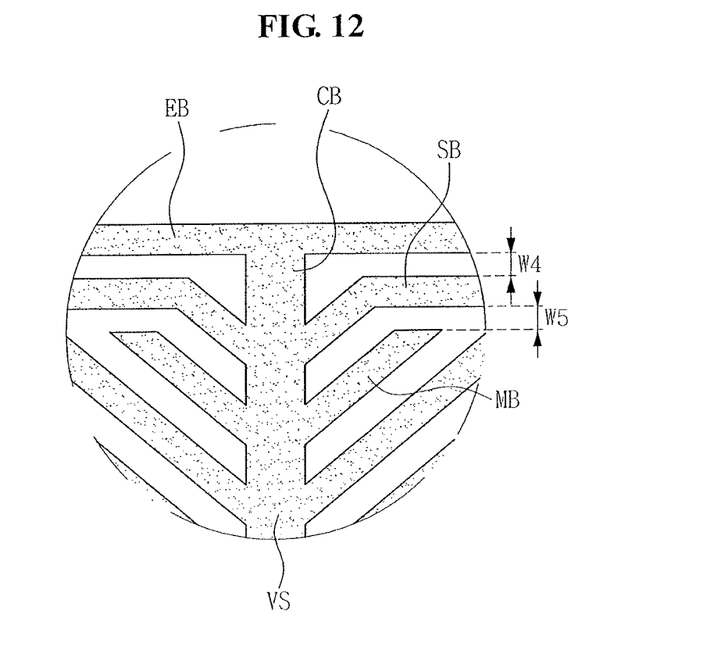
FIG. 12 illustrates an enlarged view depicting an area "C" of FIG. 11.

FIG. 11 illustrates a plan view depicting an embodiment of a pixel electrode, and FIG. 12 illustrates an enlarged view depicting an area "C" of FIG. 11. Descriptions of common features with the pixel electrode described above will not be repeated.

Referring to FIG. 11, a pixel electrode $PE_n$ may include a first stem portion HS extending in a first direction D1, a second stem portion VS extending in a second direction D2 that intersects the first direction D1, a plurality of branch portions MB diagonally extending from at least one of the first stem portion HS and the second stem portion VS, a bent portion SB extending from at least one of the plurality of branch portions MB, a connecting portion CB extending from at least one of the first stem portion HS and the second stem portion VS to protrude beyond the branch portion MB in the first direction D1 or the second direction D2, and an edge bar EB intersecting the connecting portion CB. In addition, the pixel electrode $PE_n$ may further include a connecting electrode CNE connected to a drain electrode DE. The first stem portion HS and the second stem portion VS may form a cross shape.

In FIG. 11, the edge bar EB is depicted as extending parallel to the first stem portion HS. In some implementations, the edge bar EB may extend at a predetermined angle with respect to the first stem portion HS. In some implementations, the edge bar EB may extend parallel to the second stem portion VS. The edge bar EB may be substantially parallel to an adjacent one of the bent portions SB. The edge bar EB may have the same length as at least one of the first stem portion HS and the second stem portion VS.

Referring to FIG. 12, the connecting portion CB may have a length ranging from about 2 µm to about 10 µm. The edge bar EB may have a distance W4 from an adjacent one of the bent portions SB ranging from about 2 µm to about 10 µm.

Similarly, the bent portion SB may have a distance W5 from an adjacent one of the branch portions MB ranging from about 2 µm to about 10 µm.

The term "length" with respect to the connecting portion CB refers to the distance that the connecting portion extends in the first direction or the second direction beyond the farthest extension of the branch portions MB in same first direction or second direction. For example, the length of the connecting portion may be the same as the distance W3 between the edge bar EB and an adjacent one of the branch portions MB as shown in FIG. 10 or may be the same as the distance W4 between the edge bar EB and an adjacent one of the bent portions SB.

In some implementations, the distance W4 between the edge bar EB and the bent portion SB may be the same as the distance W5 between the bent portion SB and the branch portion MB.

As such, when the bent portion SB and the edge bar EB are provided along an edge of the pixel electrode $PE_n$, an effect of a fringe field that externally exerts inwardly of the pixel electrode $PE_n$ may be significantly reduced. Accordingly, control over liquid crystals at the edge of the pixel electrode $PE_n$ may be improved, and the display quality of the LCD device may be improved.

By way of summation and review, an LCD device in a vertically aligned mode, in which a major axis of liquid crystal molecules are aligned to be perpendicular to the substrate in the absence of an electric field, has a relatively great contrast ratio and may provide a wide viewing angle.

In recent times, a technology to improve viewing angle properties of an LCD device has been used whereby a pixel electrode is divided into multiple domains. Upon applying a voltage, liquid crystal molecules are aligned in different directions in respective domains. In such an example, however, when a general pixel electrode has a quadrangular shape, liquid crystal molecules may not be aligned in a desired direction due to a fringe field at an edge portion of the pixel electrode, thus resulting in a degraded display quality.

As set forth hereinabove, in one or more exemplary embodiments of an LCD device, a pixel electrode is provided with a shape such that control over liquid crystals is improved at an edge of the pixel electrode and display quality is also improved.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope thereof as set forth in the following claims.

What is claimed is:

1. A display substrate, comprising:
a base substrate;
a thin film transistor on the base substrate; and
a pixel electrode connected to the thin film transistor, wherein
the pixel electrode includes:
a first stem portion extending in a first direction;
a second stem portion extending from the first stem portion in a second direction that intersects the first direction;
a first branch portion; and
a second branch portion,
wherein the first branch portion includes:
a first-first portion extending from one of the first stem portion and the second stem portion in a third direction that intersects the first and second directions, and
wherein the second branch portion includes:
a second-first portion extending from one of the first stem portion and the second stem portion in the third direction; and
a second-second portion extending the second-first portion in a fourth direction that intersects the third direction and being adjacent to and spaced apart from the first-first portion extending toward the second-second portion.

2. The display substrate as claimed in claim 1, wherein the first-first portion is adjacent to the second-first portion.

3. The display substrate as claimed in claim 1, wherein the pixel electrode includes a third branch portion, and the third branch portion includes a third-first portion extending from at least one of the first stem portion and the second stem portion in the third direction.

4. The display substrate as claimed in claim 3, wherein:
the second-second portion is adjacent to and spaced apart from the third-first portion, and
the third-first portion is adjacent to the first-first portion.

5. The display substrate as claimed in claim 3, wherein the pixel electrode includes a fourth branch portion, and the fourth branch portion includes:
a fourth-first portion extending from one of the first stem portion and the second stem portion in the third direction; and
a fourth-second portion extending from the fourth-first portion in the fourth direction and being adjacent to and spaced apart from the third-first portion and the second-second portion.

6. The display substrate as claimed in claim 5, wherein the fourth-second portion is spaced apart from the second-second portion by a distance same as a distance between the first-first portion and the fourth-first portion.

7. The display substrate as claimed in claim 1,
wherein the fourth direction is substantially same as one of the first and second directions.

8. The display substrate as claimed in claim 1,
wherein the first stem portion and the second stem portion form a cross shape.

9. The display substrate as claimed in claim 1, wherein the second-second portion is spaced apart from the first-first portion by a distance ranging from about 2 µm to about 10 µm.

10. The display substrate as claimed in claim 1, wherein the first stem portion protrudes in the first direction from the second stem portion.

11. A liquid crystal display device, comprising:
a first substrate;
a second substrate opposing the first substrate; and
a liquid crystal layer between the first substrate and the second substrate, wherein the first substrate includes:

a base substrate;
a thin film transistor on the base substrate; and
a pixel electrode connected to the thin film transistor, the pixel electrode includes:
a first stem portion extending in a first direction;
a second stem portion extending from the first stem portion in a second direction that intersects the first direction;
a first branch portion; and
a second branch portion,
the first branch portion includes:
a first-first portion extending from one of the first stem portion and the second stem portion in a third direction that intersects the first and second directions, and
wherein the second branch portion includes:
a second-first portion extending from one of the first stem portion and the second stem portion in the third direction; and
a second-second portion extending the second-first portion in a fourth direction that intersects the third direction and being adjacent to and spaced apart from the first-first portion extending toward the second-second portion.

12. A display substrate, comprising:
a base substrate;
a thin film transistor on the base substrate; and
a pixel electrode connected to the thin film transistor, wherein the pixel electrode includes:
a first stem portion extending in a first direction;
a second stem portion extending from the first stem portion in a second direction that intersects the first direction;
a plurality of branch portions extending from at least one of the first stem portion and the second stem portion in a third direction that intersects the first and second directions; and
an edge bar extending from the first stem portion in a fourth direction that intersects the first and third directions, wherein the edge bar is adjacent to and spaced apart from the plurality of the branch portions extending toward the edge bar.

13. The display substrate as claimed in claim 12, wherein the fourth direction is substantially same as the second direction.

14. The display substrate as claimed in claim 12, wherein:
the first stem portion includes a connecting portion protruding in the first direction beyond the plurality of the branch portions that extend from the first stem portion, and
the edge bar extends from the connecting portion in the fourth direction.

15. The display substrate as claimed in claim 12, wherein the edge bar is adjacent to and spaced apart from the plurality of the branch portions at a distance ranging from about 2 μm to about 10 μm.

16. The display substrate as claimed in claim 12, wherein the plurality of the branch portions include:
a first branch portion; and
a second branch portion,
wherein the first branch portion includes:
a first-first portion extending from one of the first stem portion and the second stem portion in the third direction, and
wherein the second branch portion includes:
a second-first portion extending from one of the first stem portion and the second stem portion in the third direction; and
a second-second portion extending from the second-first portion in a fifth direction that intersects the third direction.

17. The display substrate as claimed in claim 16, wherein the edge bar is adjacent to and spaced apart from the second-second portion.

18. The display substrate as claimed in claim 16, wherein the fifth direction is substantially same as fourth direction.

19. A liquid crystal display device, comprising:
a first substrate;
a second substrate opposing the first substrate; and
a liquid crystal layer between the first substrate and the second substrate, wherein the first substrate includes:
a base substrate;
a thin film transistor on the base substrate; and
a pixel electrode connected to the thin film transistor, and
wherein the pixel electrode includes:
a first stem portion extending in a first direction;
a second stem portion extending from the first stem portion in a second direction that intersects the first direction;
a plurality of branch portions extending from at least one of the first stem portion and the second stem portion in a third direction that intersects the first and second directions; and
an edge bar extending from the first stem portion in a fourth direction that intersects the first and third directions, wherein the edge bar is adjacent to and spaced apart from the plurality of the branch portions extending toward the edge bar.

* * * * *